(12) United States Patent
Katana et al.

(10) Patent No.: US 12,027,931 B2
(45) Date of Patent: Jul. 2, 2024

(54) RESOLVER FOR AN ELECTRIC MACHINE

(71) Applicant: MAGNA Powertrain GmbH & Co KG, Lannach (AT)

(72) Inventors: Miodrag Katana, Berndorf (AT); Erguen Guener, Vienna (AT); Markus Mathis, Vienna (AT); Philip Fong, Vienna (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 171 days.

(21) Appl. No.: 17/912,965

(22) PCT Filed: Feb. 17, 2021

(86) PCT No.: PCT/EP2021/053910
§ 371 (c)(1),
(2) Date: Sep. 20, 2022

(87) PCT Pub. No.: WO2021/190827
PCT Pub. Date: Sep. 30, 2021

(65) Prior Publication Data
US 2023/0113254 A1    Apr. 13, 2023

(30) Foreign Application Priority Data
Mar. 25, 2020 (DE) .................. 10 2020 203 837.6

(51) Int. Cl.
*H02K 24/00* (2006.01)
*G01B 7/30* (2006.01)
(Continued)

(52) U.S. Cl.
CPC ............... *H02K 24/00* (2013.01); *G01B 7/30* (2013.01); *G01D 5/204* (2013.01); *G01K 1/14* (2013.01);
(Continued)

(58) Field of Classification Search
CPC ...... H02K 24/00; H02K 11/225; H02K 11/25; H02K 5/225; G01B 7/30; G01D 5/204;
(Continued)

(56) References Cited

U.S. PATENT DOCUMENTS 6,081,056 A    6/2000 Takagi et al.
2008/0036315 A1*  2/2008 Makiuchi ............. G01D 11/245
                                              310/71
(Continued)

FOREIGN PATENT DOCUMENTS

DE    102011101932 A1    5/2012
DE    102017215729 A1    3/2019
(Continued)

OTHER PUBLICATIONS

European Patent Office, Rijswijk, Netherlands, International Search Report of International Application No. PCT/EP2021/053910, Mailed May 17, 2021, 2 pages.
(Continued)

*Primary Examiner* — Alvaro E Fortich
(74) *Attorney, Agent, or Firm* — Dickinson Wright PLLC

(57) ABSTRACT

A resolver for an electric machine includes a resolver stator and a connection module. The resolver stator and the connection module are formed as a single piece. The connection module includes a first plugging portion, which has at least one first contact pin and at least one second contact pin, and a second plugging portion, which has at least one third contact pin. The first contact pin is electrically connected to the resolver stator, and the second contact pin is electrically connected to the third contact pin.

14 Claims, 3 Drawing Sheets

(51) Int. Cl.
  *G01D 5/20*      (2006.01)
  *G01K 1/14*      (2021.01)
  *H01R 27/02*     (2006.01)
  *H02K 11/225*    (2016.01)
  *H02K 11/25*     (2016.01)

(52) U.S. Cl.
  CPC .......... *H01R 27/02* (2013.01); *H02K 11/225* (2016.01); *H02K 11/25* (2016.01); *H01R 2201/10* (2013.01)

(58) Field of Classification Search
  CPC ........ G01D 11/245; G01K 1/14; H01R 27/02; H01R 2201/10
  See application file for complete search history.

(56) References Cited

U.S. PATENT DOCUMENTS

| | | | |
|---|---|---|---|
| 2012/0262015 A1 | 10/2012 | Shin et al. | |
| 2013/0049742 A1* | 2/2013 | Ochiai | G01D 5/2013 324/207.16 |
| 2013/0257201 A1* | 10/2013 | Lemke | H02K 5/225 310/71 |
| 2015/0061651 A1* | 3/2015 | Ozaki | H02K 3/522 324/207.16 |
| 2018/0097421 A1* | 4/2018 | Abe | H02K 3/32 |

FOREIGN PATENT DOCUMENTS

| | | |
|---|---|---|
| EP | 2453560 A2 | 5/2012 |
| EP | 2500575 A1 | 9/2012 |
| JP | 2010127834 A | 6/2010 |

OTHER PUBLICATIONS

Reif, Konrad; Sensoren im Kraftfahrzeug. 1. Aufl. Wiesbaden : Vieweg + Teubner, 2010 (Bosch Fachinformation Automobil). 21-23—ISBN 978-3-8348-1315-2; 7 pages.

\* cited by examiner

RESOLVER FOR AN ELECTRIC MACHINE

CROSS-REFERENCE TO RELATED APPLICATIONS

This application is a National Stage of International Application No. PCT/EP2021/053910, filed Feb. 17, 2021, which claims priority to German Application No. DE 10 2020 203 837.6, filed Mar. 25, 2020. The entire disclosures of each of the above applications are incorporated herein by reference.

FIELD

The present disclosure relates to a resolver for an electric machine, including a resolver stator and a connection module, the resolver stator and the connection module being constructed in one piece, and the connection module including a first plug-in section and a second plug-in section.

BACKGROUND

This section provides information related to the present disclosure which is not necessarily prior art.

In electric machines, especially in permanently excited synchronous motors, the respective rotor positions are needed for the purpose of controlling the machines. Resolvers as angle transducers represent a possible technical concept in order to measure the rotor-position angles needed for the control of electric machines.

A "resolver" is accordingly to be understood to mean a system for measuring angles, in particular between a stator and a rotor of an electric machine. Quantities such as the absolute position of the motor shaft and consequently the absolute rotor position, the rotational speed, and/or the direction of rotation of the electric machine can subsequently be ascertained from the measured rotor-position angles.

A resolver includes a rotatable resolver rotor and a fixed resolver stator, the resolver rotor and the resolver stator being spaced from one another via an air gap of the resolver. The resolver rotor may, in particular, have been mounted on a rotatable component such as, for instance, the rotor of an electric machine. Various types of resolvers are known from the prior art, wherein, in principle, a changing magnetic field is generated by way of at least one coil, and this field is detected by way of at least one further coil as a function of the position or angular position to be measured.

Besides the detection of the rotor-angle position of a rotor of an electric machine, temperatures within the electric machine—in particular, at the winding heads of stator windings of a stator—constitute an important quantity of an electric machine to be registered.

All the registered quantities are registered, as a rule, via power electronics of an electric machine. "Power electronics" is to be understood to mean, in particular, that portion of the electronic components of an electric machine which can influence—in particular, switch—the currents of the electric machine.

In order to be able to design an electric machine in particularly component-efficient and construction-space-efficient manner and, where appropriate, to be able to guarantee a simple and cost-optimized repair in the case of a service, it is desirable to combine as many electrical interfaces as possible on one component.

SUMMARY OF THE INVENTION

This section provides a general summary of the disclosure, and is not a comprehensive disclosure of its full scope or all of its features It is an object of the invention to specify an improved resolver for an electric machine having a component-efficient and construction-space-efficient structure and which includes, in compact manner, all of the electrical interfaces for registering a rotor-angle position and also for registering at least one temperature of a stator winding head.

This need can be met by the subject-matter of the present disclosure. Advantageous embodiments of the present disclosure are described herein.

The resolver according to the invention for an electric machine comprises a resolver stator and a connection module.

According to the present invention, the resolver stator has been constructed in one piece with the connection module.

In accordance with the invention, the connection module includes a first plug-in section and a second plug-in section.

In accordance with the invention, the first plug-in section includes at least one first contact pin and at least one second contact pin. In accordance with the invention, the second plug-in section includes at least one third contact pin. According to the present invention, the first contact pin is electrically connected to the resolver stator, and the second contact pin is electrically connected to the third contact pin.

In a particularly preferred embodiment, the first plug-in section is capable of being connected to a first mating connector, and the second plug-in section is capable of being connected to a second mating connector, the first mating connector being electrically connected via a cable harness to a connector for connecting to power electronics of an electric machine, and the second mating connector being electrically connected to at least one temperature sensor of an electric machine.

The resolver stator and the connection module have preferentially been constructed in one piece with the aid of a plastic encapsulation.

By way of the design of the resolver according to the invention, in particular by virtue of the design of the connection module, an electrical collecting-point is realized for receiving the signals of the resolver and also for receiving temperature values on the part of an electric machine. In such a manner, all of the signal lines carrying this information in the direction of the power electronics can be combined in one cable harness, and a particularly component-efficient and construction-space-efficient resolver can be created. Furthermore, by virtue of this bundling on one component, it is possible to guarantee a cost-optimized repair in the case of a service.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

The invention will be described in exemplary manner in the following with reference to the drawings.

DETAILED DESCRIPTION

Figure 1:
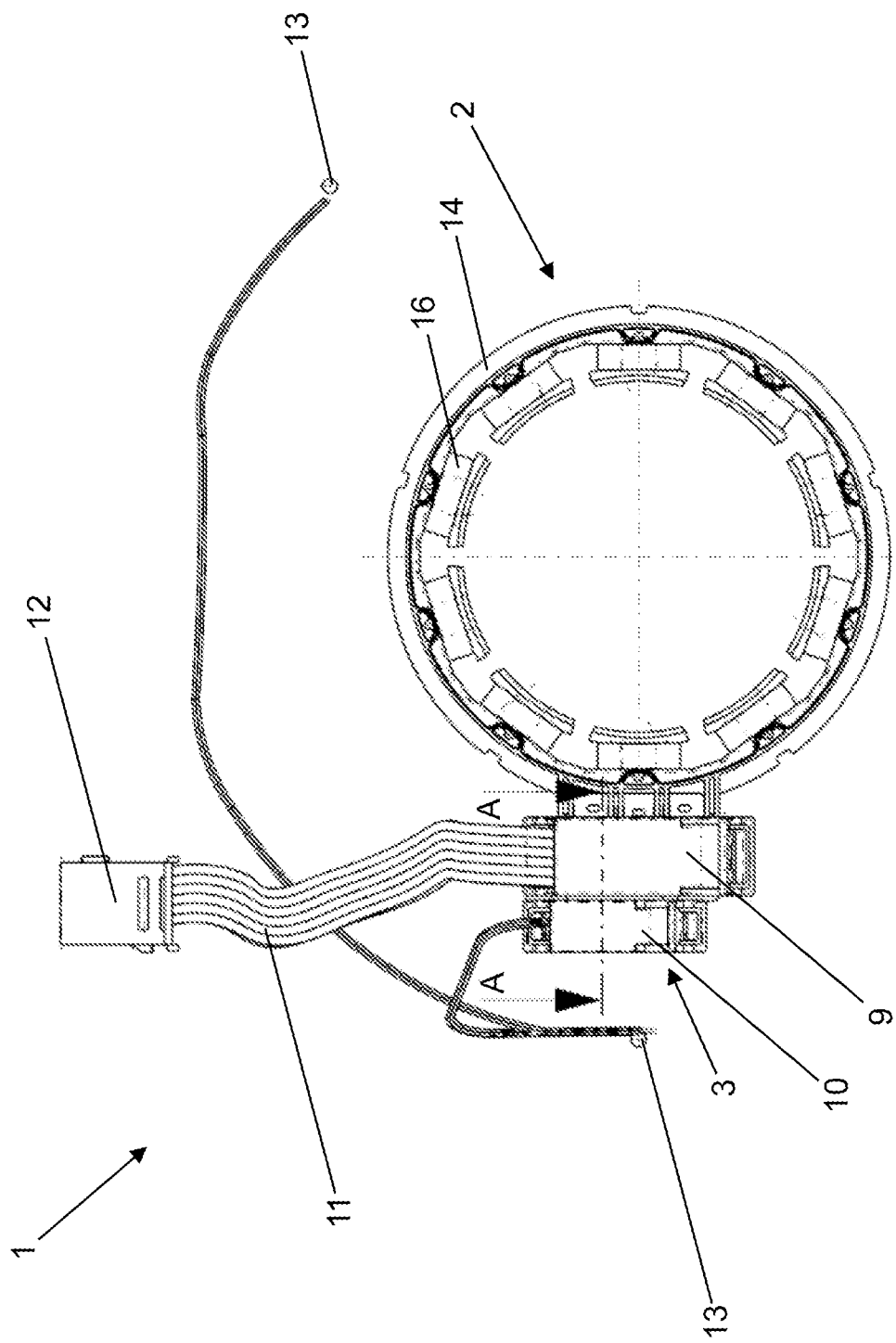
FIG. 1 shows a schematic representation of a resolver.
Figure 2:
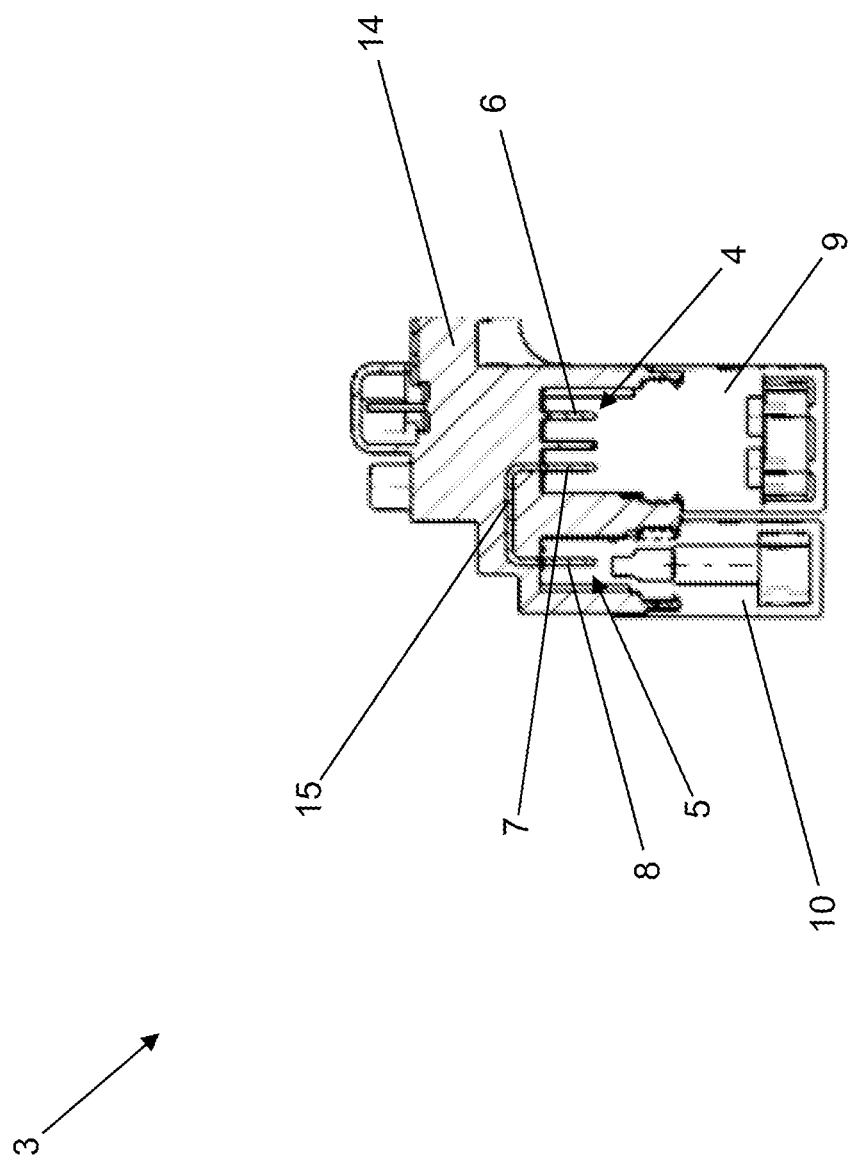
FIG. 2 shows a sectional view along sectional plane A-A from FIG. 1.
Figure 3:
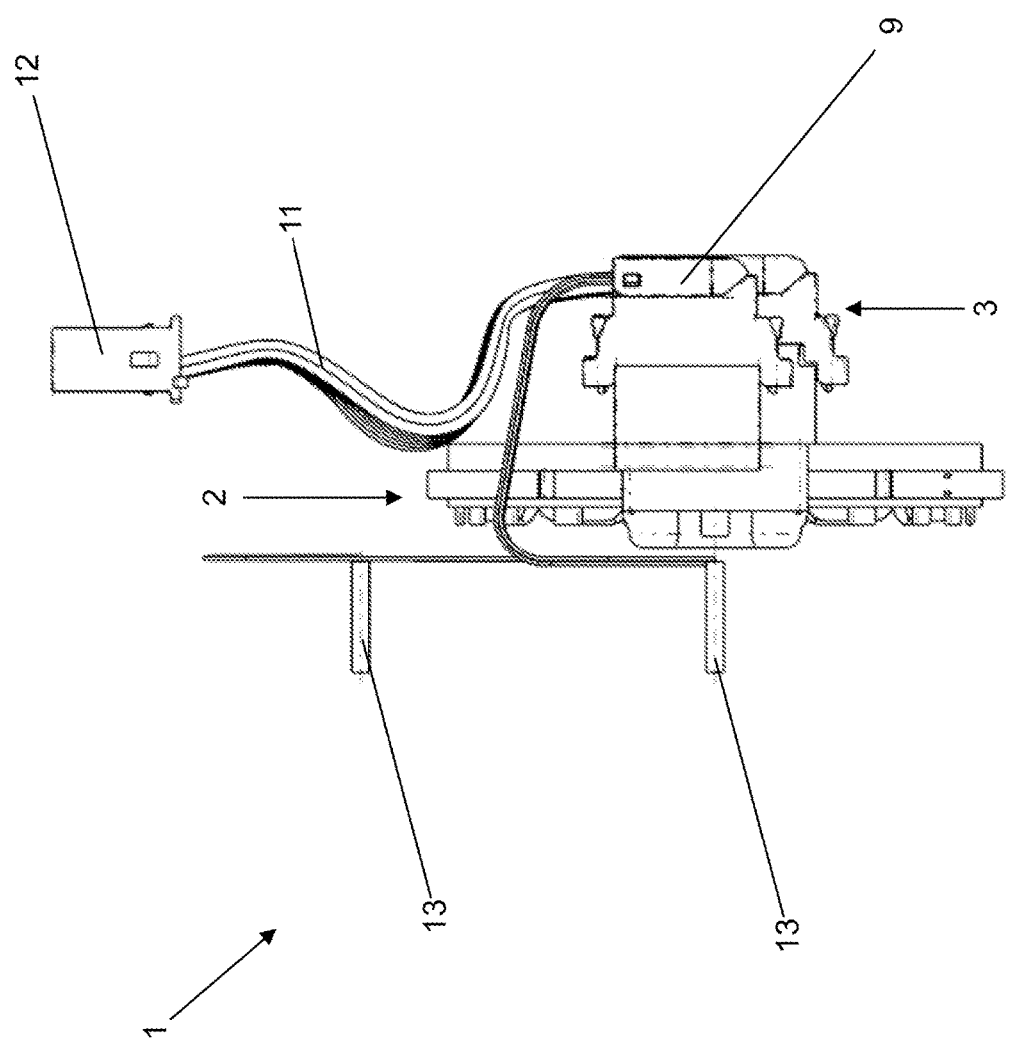
FIG. 3 shows a side view of a resolver corresponding to FIG. 1.

FIG. 1 to FIG. 3 show an embodiment of a resolver 1 in differing views. However, it will be understood that the disclosed embodiment is purely exemplary, and other embodiments may have different and alternative configurations.

The resolver includes a rotatable resolver rotor (not represented) and a fixed resolver stator 2. The resolver rotor and the resolver stator 2 are spaced from one another via an air gap of the resolver. The resolver rotor may, in particular, have been mounted on a rotatable component such as, for instance, the rotor of an electric machine. The resolver stator 2 includes, in this example, a total of ten resolver-stator windings 16. The resolver-stator windings 16 consist of copper and are interconnected.

The resolver 1 further includes a connection module 3, the connection module 3 and the resolver stator 2 having been constructed in one piece, namely with the aid of a plastic encapsulation 14 (FIG. 1). The plastic encapsulation 14 has been constructed to be electrically insulating.

The connection module 3 includes a first plug-in section 4 and a second plug-in section 5.

The first plug-in section 4 includes several, namely—in the present embodiment—five, first contact pins 6 and several second contact pins 7. The second plug-in section 5 includes several, namely—in the present embodiment—three, third contact pins 8. The first contact pins 6 are respectively electrically connected to the resolver stator 2, more precisely to the winding heads thereof. The second contact pins 7 are respectively electrically connected to a third contact pin 8 in each instance—that is to say, the number of second contact pins 7 corresponds to the number of third contact pins 8 (in this example, three). The electrical connection between a second contact pin 7 and a third contact pin 8 is made in each instance via a substantially u-shaped conductor bracket 15. The u-shaped conductor bracket 15 has been partially embedded into the plastic encapsulation 14, namely apart from its ends which respectively form the second contact pins 7 and the third contact pins 8 (FIG. 2).

The first plug-in section 4 is capable of being connected to a first mating connector 9, and the second plug-in section 5 is capable of being connected to a second mating connector 10 (FIG. 1-FIG. 3).

The first mating connector 9 is electrically connected to a connector 12 via a cable harness 11. The connector 12 can be connected to power electronics of an electric machine (FIG. 1, FIG. 3). In the present embodiment, the second mating connector 10 is connected to two temperature sensors 13 which serve for registering a temperature within an electric machine, more precisely at a winding head of a stator of an electric machine.

The cable harness 11 contains both the signal lines of the resolver 1 and the signal lines of the two temperature sensors 13.

LIST OF REFERENCE SIGNS 1 resolver
2 resolver stator
3 connection module
4 first plug-in section
5 second plug-in section
6 first contact pin
7 second contact pin
8 third contact pin
9 first mating connector
10 second mating connector
11 cable harness
12 connector
13 temperature sensor
14 plastic encapsulation
15 conductor bracket
16 resolver-stator winding

What is claimed is:

1. A resolver for an electric machine, comprising:
a resolver stator, and
a connection module,
wherein the resolver stator and the connection module are constructed in one piece,
wherein the connection module includes a first plug-in section, the first plug-in section having at least one first contact pin and at least one second contact pin, and
wherein the connection module includes a second plug-in section having at least one third contact pin,
wherein the first contact pin is electrically connected to the resolver stator, and the second contact pin is electrically connected to the third contact pin.

2. The resolver as claimed in claim 1,
wherein the first plug-in section is configured for connection to a first mating connector, and
wherein the second plug-in section is configured for connection to a second mating connector,
wherein the first mating connector is electrically connected via a cable harness to a connector for connecting to power electronics of an electric machine, and
wherein the second mating connector is electrically connected to at least one temperature sensor of an electric machine.

3. The resolver as claimed in claim 1,
wherein the resolver stator and the connection module are constructed in one piece with the aid of a plastic encapsulation.

4. The resolver as claimed in claim 1, further comprising a conductor bracket that electrically connects the second contact pin and the third contact pin.

5. The resolver according to claim 4, wherein the conductor bracket is at least partially embedded in a plastic encapsulation, wherein the plastic encapsulation combines the connection module and the resolver stator into a one-piece construction.

6. The resolver according to claim 5, wherein the conductor bracket includes opposite ends extending out from the plastic encapsulation, wherein the opposite ends define the second and third contact pins.

7. The resolver according to claim 2, wherein a first mating connector is connected with the first plug-in section and the first and second contact pins, and a second mating connector is connected to the second plug-in section and the third contact pins.

8. The resolver according to claim 7, wherein a cable harness extends from the first mating connector to a connector for power electronics, the cable harness containing signal lines transmitting data from both the first contact pins and third contact pins.

9. The resolver according to claim 8, wherein the third contact pins receive data from temperature sensors via the second mating, and the second contact pins receive data from the third contact pins.

10. The resolver according to claim 9, wherein the first contact pins receive data from the resolver stator windings, and the first mating connector transmits data from the first contact pins and the second contact pins to the connector for power electronics.

11. The resolver according to claim 10, wherein the temperature sensors detect temperature from stator windings of an electric machine.

12. The resolver according to claim 1, wherein the first plug-in section and the second plug-in section are part of a common housing of the connection module.

13. The resolver according to claim 1, wherein the quantity of second contact pins is the same as the quantity of third contact pins.

14. The resolver according to claim 13, wherein the quantity of first contact pins is greater than the quantity of second contact pins.

* * * * *